United States Patent
Motoyanagi et al.

(10) Patent No.: US 9,705,390 B2
(45) Date of Patent: Jul. 11, 2017

(54) OSCILLATING TYPE ACTUATOR HAVING SUFFICIENT HOLDING FORCE WITHOUT ELECTRIC CURRENT

(71) Applicants: Masayuki Motoyanagi, Nihonmatsu (JP); Atsushi Matsumoto, Nihonmatsu (JP)

(72) Inventors: Masayuki Motoyanagi, Nihonmatsu (JP); Atsushi Matsumoto, Nihonmatsu (JP)

(73) Assignee: Oki Micro Engineering Company Limited, Fiukushima (JP)

(*) Notice: Subject to any disclaimer, the term of this patent is extended or adjusted under 35 U.S.C. 154(b) by 153 days.

(21) Appl. No.: 14/436,023

(22) PCT Filed: Mar. 15, 2013

(86) PCT No.: PCT/JP2013/057376
§ 371 (c)(1),
(2) Date: Apr. 15, 2015

(87) PCT Pub. No.: WO2014/061286
PCT Pub. Date: Apr. 24, 2014

(65) Prior Publication Data
US 2015/0270764 A1    Sep. 24, 2015

(30) Foreign Application Priority Data

Oct. 16, 2012    (JP) ................. 2012-229361

(51) Int. Cl.
| H02K 33/00 | (2006.01) |
| H02K 5/14 | (2006.01) |
| H02K 33/12 | (2006.01) |
| H02K 33/16 | (2006.01) |

(52) U.S. Cl.
CPC ............. *H02K 33/12* (2013.01); *H02K 33/16* (2013.01)

(58) Field of Classification Search
CPC .................................. H02K 33/06; H01F 7/02
USPC ...................................... 310/27, 36, 38, 40 R
See application file for complete search history.

(56) References Cited

FOREIGN PATENT DOCUMENTS

| JP | 05103455 A | * | 4/1993 |
| JP | H10-174409 | | 6/1998 |
| JP | H11-299211 | | 10/1999 |
| JP | 2001-083567 | | 3/2001 |

(Continued)

*Primary Examiner* — Jose Gonzalez Quinones
(74) *Attorney, Agent, or Firm* — Muramatsu & Associates

(57) ABSTRACT

To provide a novel oscillating type actuator capable of securing a stoppage and holding when not energized, and producing a stable, responsive and highly durable oscillating arm even using a non-rare each magnet. The actuator is constituted by a housing; a shaft supported in the housing to be axially rotatable and has an output part to produce an output; a plate-shape oscillating arm that is fixedly supported to a shaft and has a swing surface perpendicular to the axis of the shaft, the oscillating arm performing a swing in a predetermine rotation angle range; two permanent magnets arranged along a swing direction of the oscillating arm and have pole faces different from each other on the swing surface; two magnet coils opposingly arranged to respectively face the permanent magnets; and a pair of interpoles arranged around a periphery of each of the magnet coils to opposingly sandwich one of the permanent magnets arranged side by side.

7 Claims, 10 Drawing Sheets

(56) References Cited

FOREIGN PATENT DOCUMENTS

| JP | 2009-038874 | 2/2009 |
| JP | 2009-284710 | 12/2009 |
| JP | 2012-175735 | 9/2012 |

* cited by examiner

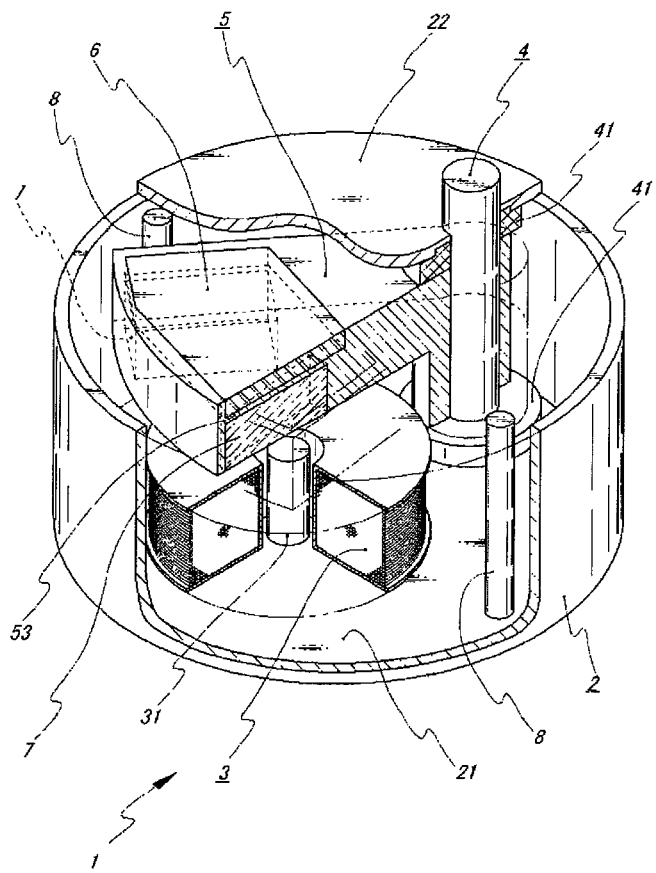
Fig. 9
(a)
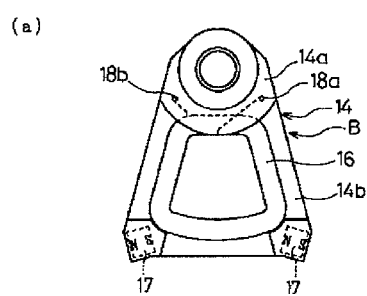
Fig. 10
(b)
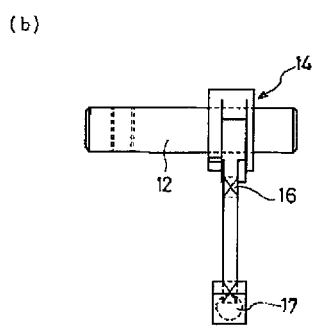

OSCILLATING TYPE ACTUATOR HAVING SUFFICIENT HOLDING FORCE WITHOUT ELECTRIC CURRENT

This application is a national stage of International Application No. PCT/JP2013/057376 filed Mar. 15, 2013, which claims the benefit of foreign filing based on Japanese Patent Application No. 2012-229361 filed Oct. 16, 2012, the entire contents of which are incorporated herein by reference.

FIELD OF THE INVENTION

The invention in this application relates to an actuator that makes a center-of-a-circle swing which strengthens stop-holding force at the time of no energizing by electricity.

BACKGROUND OF THE INVENTION

In general, for an oscillating type actuator (hereafter "actuator") which makes reciprocating rotational movement ("center-of-a-circle swing") in a predetermined rotation angle range, a stator and a moving element are installed in a housing. The stator is equipped with a magnet coil which makes circuitry connection to a reciprocal transformation means of a electric current direction, and the moving element is equipped with a permanent magnet. The circular reciprocating movement ("center-of-a-circle swing") is carried out for the moving element within the limit of a predetermined central angle by changing directions of a magnetic field (or magnetic flux) by the change of the energizing direction to the aforementioned magnet coil, and by producing the magnetic propulsion force of attraction and repulsion between the magnet coil and the permanent magnet.

Such an actuator is widely used as a power source in various industrial equipment. For example, it is used as a driving means of a flap for changing paper feeding directions, such as in ATM (automatic teller's machine) and a printer.

This type of flap is more often being stopped at one of the end sides (beginning/ending points or a reversing position of a swing) rather than being constantly and continuously swung. As to the stopping method, there is a method that the permanent magnet and the magnet coil are attracted with one another by energizing the magnet coil by supplying electric current (energization holding). There is another method that a core (magnetic material) of the magnet coil and the permanent magnet are attracted with one another by not supplying the electric current (non-energization holding).

However, the actuator of the energization holding method is not preferable in view of recent trend in power saving and energy consumption reduction. Thus, the actuator of the non-energization holding method is preferable, especially when a standby time of ATM is long.

To respond to such needs, inventions are disclosed, for example, in Patent document 1, Patent document 2, and Patent document 3.

First, the invention disclosed in Patent document 1 relates to that shown in a prior application by the present applicant. One of the objects of the invention relates to a holding force at the time of non-energization holding like the present application.

According to the representative drawing of the prior application shown in FIG. 9, it comprises a single magnet coil (3) in a case (2), an oscillating arm (5) that is held to the shaft supported pivotally to be rotatable in the case (2), and two permanent magnets arranged in parallel with different polarities via a predetermined air gap to the magnet coil (3) and equipped to the oscillating arm (5). By this configuration, the center-of-a-circle swing is carried out due to the attraction and repulsion of magnetic forces between the energized magnetic coil (3) and the permanent magnets (7) of the oscillating arm (5) within the range prescribed by a stopper (8). This swinging force is output to the outside as a power source from an output shaft (4). In the oscillating arm (5) holding the permanent magnet (7), a back yoke (6) made of magnetic material is arranged to the counter side of the magnet coil (3), thereby controlling the magnetic flux direction of the permanent magnet (7) and strengthening magnetic force. Due to this configuration, stable holding is achieved at the position where the oscillating arm (5) is restricted by the stopper (8) due to the magnetic attraction by the residual magnetic flux of a magnetic core (31) of the non-energized magnet coil (3) and the permanent magnet (7).

Next, according to the representative drawing of the gazette attachment which is reproduced in FIG. 10, the invention disclosed in Patent document 2 has a swinging coil holder (14) which is held by a shaft (12) in a manner to swing around and constituted from a moving coil (16). A permanent magnet (17) for a latch is provided to the outside end of the swinging direction of that coil holder (14), and a magnetic material is provided in a case wall as a stopper to prescribe a swing distance for this latch magnet. By this configuration, the holding force at the non-energized time is secured by magnetic attraction between the aforementioned permanent magnet for the latch (17) and the magnetic stopper.

The invention disclosed in Patent document 3 is considered to be made based on the invention disclosed by above-mentioned Patent document 1. According to the gazette accompanying drawing which is reproduced in FIG. 11, a swing yoke (50) to which two magnets (51, 52) are fixed side by side, and a fixed yoke (30) having protruding parts (31, 32) at its sides are provided. By providing a magnet coil (43) having a main pole (41) at around the center of the fixed yoke (30), a minimum distance magnetic circuit is formed from one of the magnets (51 or 52) to a main pole (41), the fixed yoke (30), the protruding parts (31, 32), and to the other one of the magnets (52 or 51). It aims to attain the characteristic equal to or greater than the conventional technology even when the grade (residual magnetic flux density, etc.) of the magnet (for example, bond magnet, etc.) is low.

CITATION LIST

Patent Document

[Patent document 1] JP 2009-38874
[Patent document 2] JP H11-299211
[Patent document 3] JP 2012-175735

SUMMARY OF THE INVENTION

Problem to be Solved by the Invention

When aiming to strengthen the holding force at the time of non-energization, if the configuration under the technology disclosed by the Patent document 1 and the Patent document 2 is used, the effectiveness becomes high only when using a permanent magnet with high residual magnetic flux density. Therefore, in motors and actuators ("motor products") of today, it has been common to use the magnet of the high magnetic flux density already produced commercially for reduction of size and weight.

However, many of the magnets developed for high magnetic flux densities primarily use such material (neodymium (Nd), samarium (Sm), dysprosium (Dy), etc.) classified as rare earth that is of very limited quantity of production. Since the rare earth magnet has a strong magnetic force and a strong force to align the magnetic flux into one direction (coercive force), the rare earth magnet is very powerful compared with the conventional ferrite magnet.

However, the price of rare earth used for such permanent magnets is rapidly increasing due to the resource scarcity. Further, in our country where the rare earth to be used for such permanent magnets is scarce, most of the rare earth material is dependent on import. Thus, there is a concern regarding stable reservation due to various world affairs, and thus, providing motor products to a commercial market stably at a low price is a problem.

In the invention disclosed in Patent document 3, as apparent from the drawing, the component made of the magnets (51, 52) facing the main pole (41) and the swing yoke (50) is supported by the output shaft in the state of the cantilever. Accordingly, there is a problem that bending moment is applied to the mounting part of swing yoke on the output shaft by the magnetic attraction (or magnetic adsorption power) at the time of a swing. Therefore, in the disclosure of Patent document 3, it is necessary to form a whole portion extending to the output shaft by metallic material strong enough against bending toward the back side of the swing yoke that also serves as a back yoke. However, even if such a strong metallic material is used, the aforementioned bending moment is repeated by the magnetic attraction and repulsion, a bending state is gradually formed by years of use. Thus, the air gap with respect to the main pole may lost, and there is a possibility of contacting and damaging. To counter this problem to some extent, it is possible to thicken the swing yoke and form a metal plate strong enough against the bending. However, this will increase inertia moments of the swinging part due to the increased weight, which contradicts the purpose of the invention to reduce size and weight as well as inertia force for improved responsiveness.

Therefore, in view of aforementioned problems, the present invention of this application provides a new actuator which is able to achieve stop-holding force equivalent to the conventional art at the time of non-energization, a stable operation and quick start of an oscillating arm, and high durability, even when using a low price and low flux-density magnet that does not use rare earth magnet.

Means for Solving the Problem

In order to solve the aforementioned problems, the actuator according to the present invention of this application (hereinafter, "invention of this application") is constituted as follows.

Namely, it is characterized as having: a housing which has predetermined inner space; a shaft supported in the housing to be axially rotatable and has an output part to produce an output; a plate-shape oscillating arm that is fixedly supported to the shaft and has a swing surface perpendicular to the axis of the shaft, the oscillating arm performing a center-of-a-circle swing in a predetermined swing direction which is perpendicular to the axis of the shaft; two permanent magnets arranged side by side along the swing direction of the oscillating arm and have pole faces different from each other on the swing surface; two magnet coils opposingly arranged to respectively face the pole faces of both sides of the permanent magnets with an air gap; and two pairs of interpoles made of magnetic material where each pair being arranged near a corresponding end point of the swing at an outer periphery of each of the magnet coils in such a way to opposingly sandwich one of the permanent magnets arranged side by side with an air gap.

The opposing position of the pair of interpoles and the permanent magnet is preferably an outer edge part of the swing of the permanent magnets arranged side by side.

Regarding the formation of the interpole, it may be integrally formed with the housing when the housing is made of magnetic material. The interpole may also be formed to a magnetic material plate arranged to form magnetic circuit to the interpole when the housing is made of non-magnetic material.

The housing has a predetermined inner space and may comprise a case having a cylindrical shape with a bottom and a plate that fits into an opening of the case for closure. In such a housing construction, the interpole may be integrally formed by bending the bottom of the case and the plate.

A shape of the opposing faces of the interpoles is preferably a border line shape that runs along the perimeter of the permanent magnet.

The pair of magnet coils opposingly arranged to sandwich the oscillating arm may be integrally formed by providing a swing space between the opposing magnetic coils.

Effect of the Invention

The actuator of the invention according to this application achieves the effects enumerated below by taking the above configuration.

a) A pair of interpoles are opposingly arranged to sandwich one of the two permanent magnets arranged by unlike-pole side-by-side installation at the beginning and end point (or both end points of the swing distance). Thus, one of the permanent magnets that is stopped at the beginning and end point of the swing allows to form a magnetic circuit of the shortest distance with respect its residual magnetic flux and the interpole, and thus, the stop holding force by magnetic attraction can be produced with higher power on the oscillating arm at that position.

b) When the tip surfaces of the pair of the interpoles are opposingly arranged against the outer edge parts of the permanent magnets arranged side by side on the oscillating arm, a high magnetic attraction power can be generated by the magnetic flux concentration to the perimeter between the interpoles of a line end face.

c) Since the oscillating arm having permanent magnets arranged side by side is sandwiched by the two opposingly arranged magnet coils, the magnetic force (attraction or repulsive force) which arises to the permanent magnets can be made to act uniformly toward mutually opposing directions. In other words, the attraction force (or repulsive force) based on the same magnetic force operates to the permanent magnets on both surfaces of the oscillating arm in the orthogonal direction to the swinging direction. Thus, the applied force toward the shaft axis direction (thrust direction) can be canceled out. For this reason, the bending moment which acts on the shaft at the mounting part of the oscillating arm can be reduced to zero. Thereby, the oscillating arm is stably swung along the swing surface, and high durability is achieved.

d) In addition, a low price ferrite, which is widely used because it is comparatively abundant and is easy-to-acquire magnetic material, is used as a permanent magnet. Thus, it can achieve economic advantage as well as preservation of scarce resources.

BRIEF DESCRIPTION OF THE DRAWINGS

FIG. 9 is a representative drawing included in Patent document 1.

FIG. 10 is a representative drawing included in Patent document 2.

DESCRIPTION OF THE EMBODIMENTS

Figure 1:
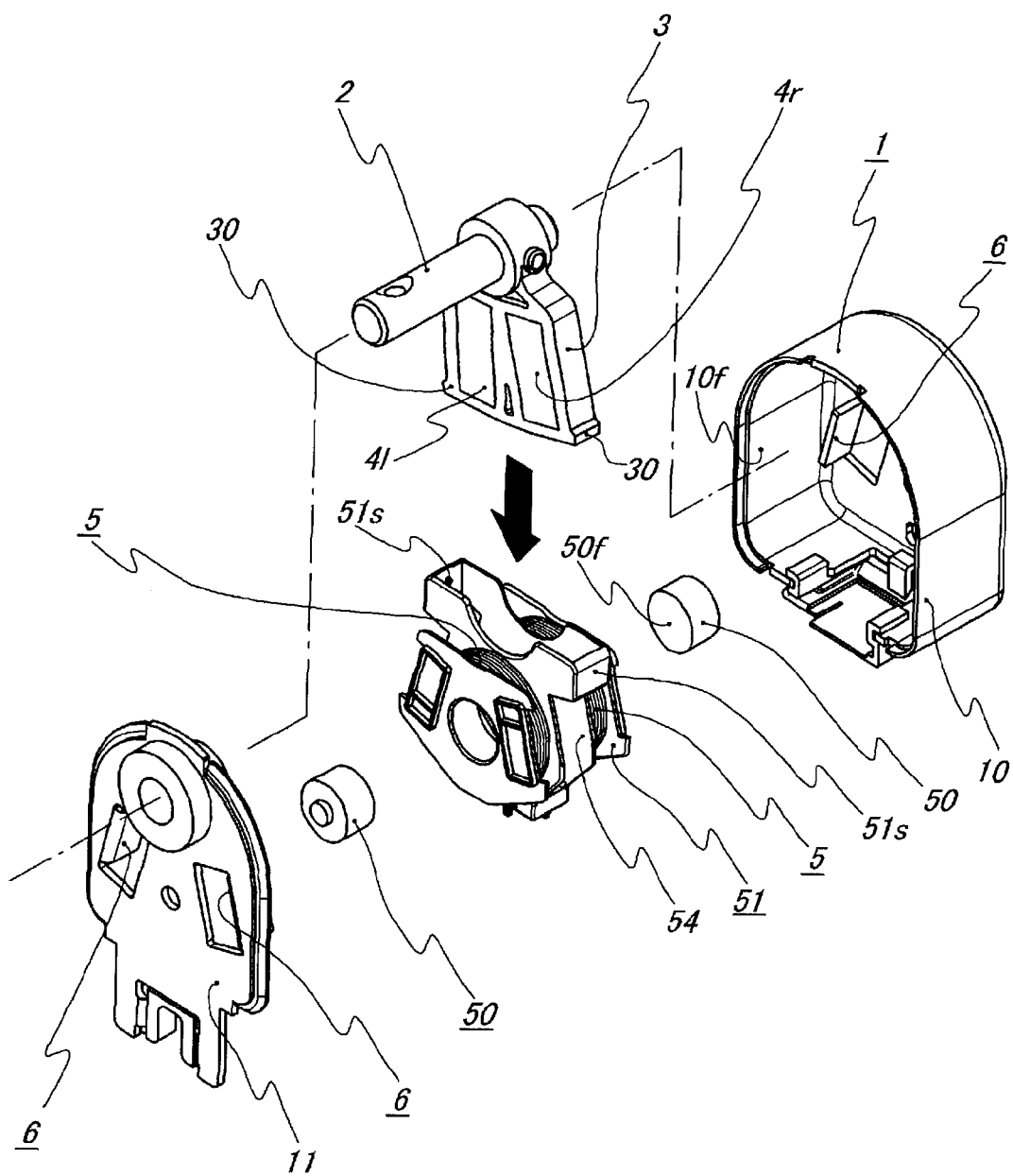
FIG. 1 is a perspective view showing exploded components constituting an embodiment example (hereinafter, "this embodiment") of the "oscillating actuator" of the present invention.
Figure 2:
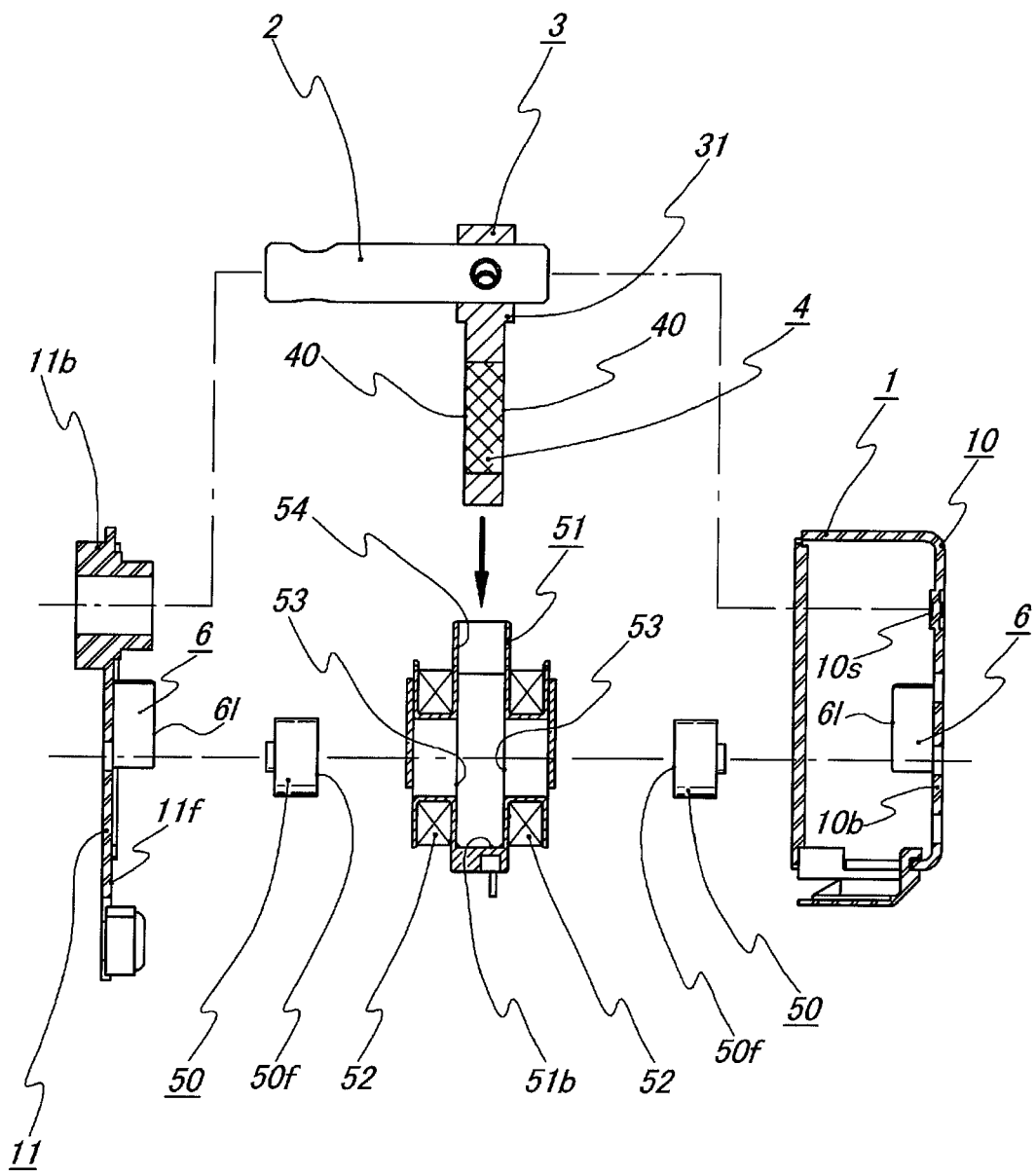
FIG. 2 is a plan view showing the exploded components of this embodiment seen from the side surface.
Figure 3A:
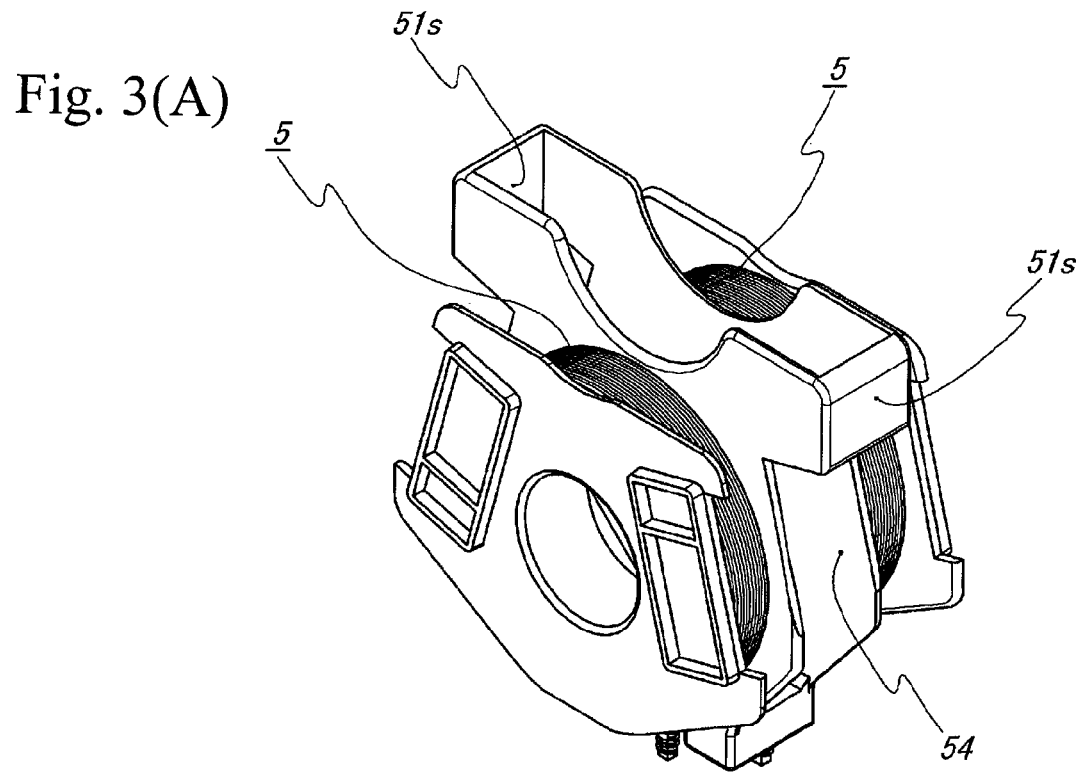
FIG. 3A is a perspective view and FIG. 3B is a longitudinal cross-section view each showing the magnet coil of this embodiment.
Figure 3B:
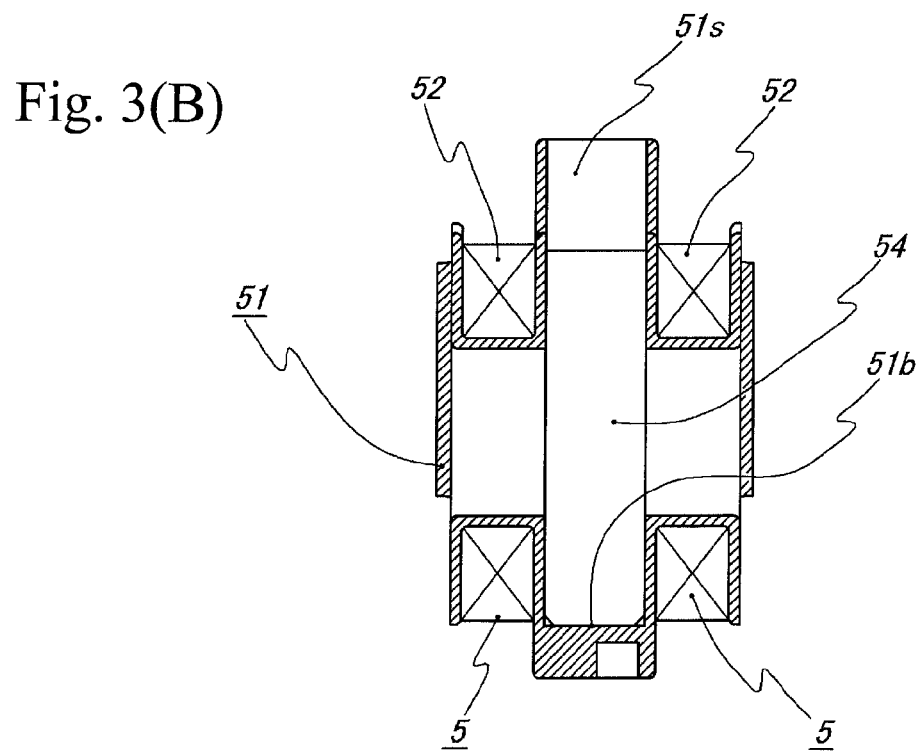
Figure 4:
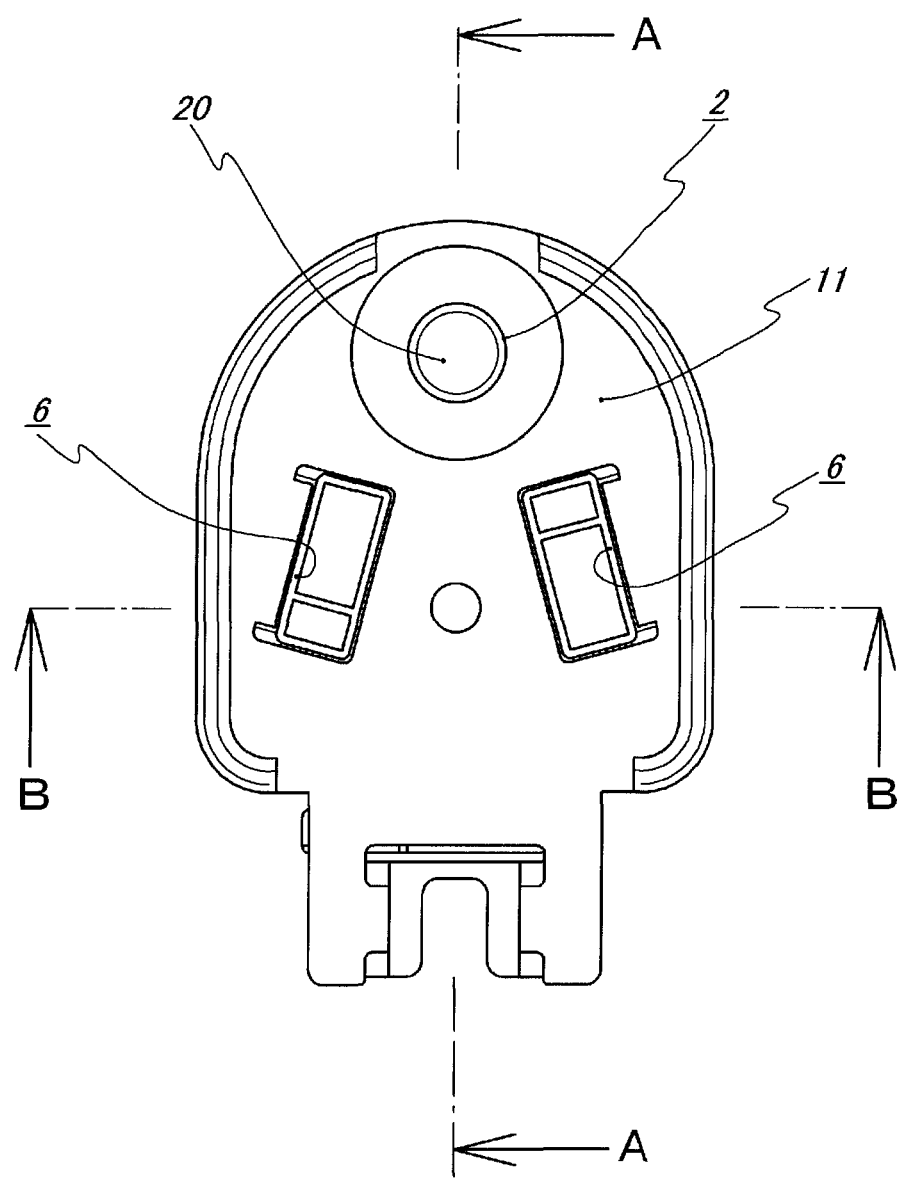
FIG. 4 is a plan view showing the front of the actuator concerning this embodiment.
Figure 5:
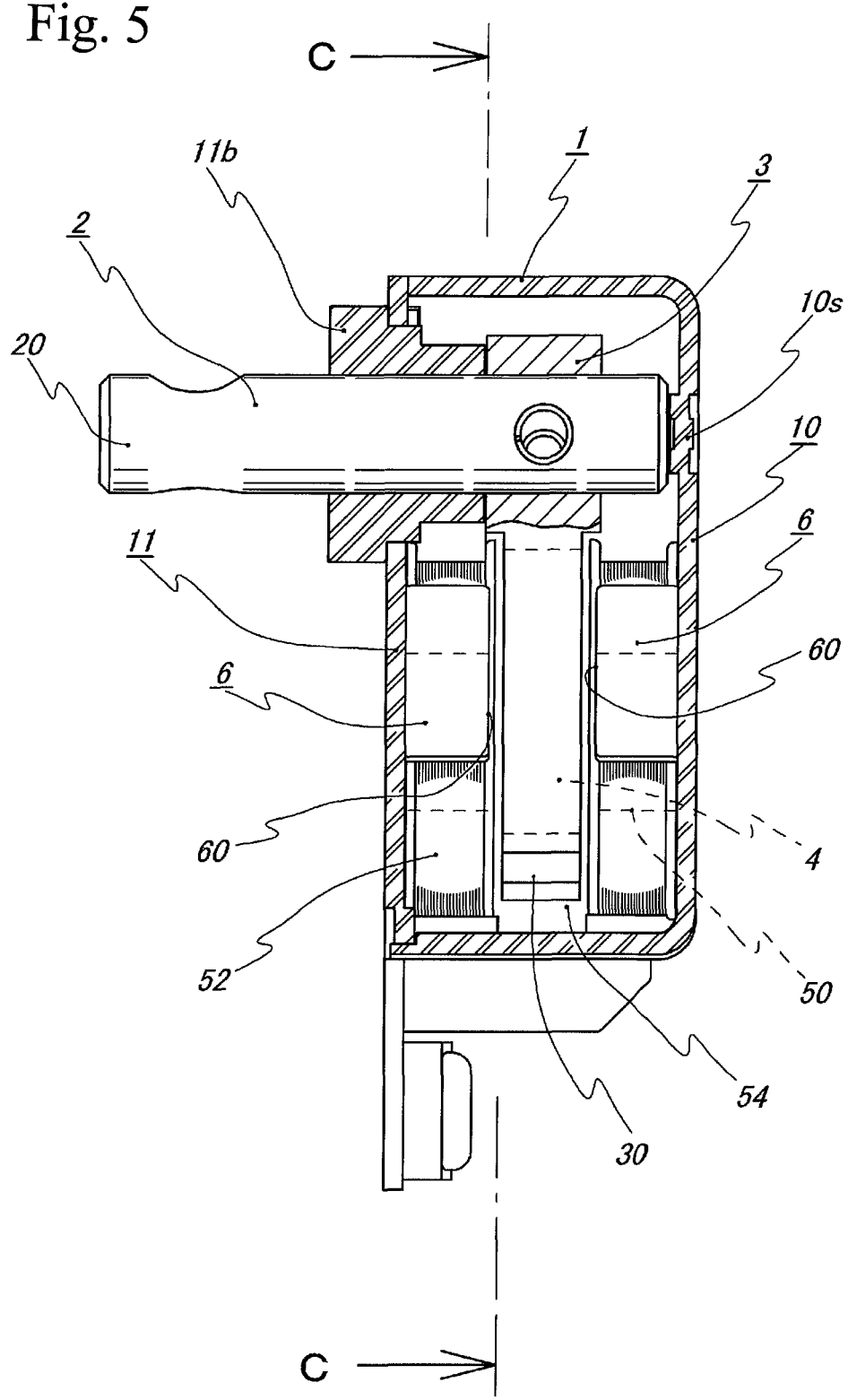
FIG. 5 is a cross sectional view taken along an A-A line of FIG. 4.

Next, an embodiment of the present invention ("this embodiment") is described. This embodiment comprises a housing 1 made of magnetic material at least a part of which can form a magnetic path, a shaft 2 supported rotatably (hereinafter, "axial support") inside the housing 1, an oscillating arm 3 attached to the shaft 2 in an annular manner, a permanent magnet 4 embedded to the oscillating arm 3, a magnet (magnetic) coil 5 that magnetically interacts with the permanent magnet 4, and a pair of interpoles 6 arranged at an outer peripheral of the magnet coils 5. In this embodiment, although there is no direction specification of top and bottom with regard to functionalities, direction of top, bottom, left and right is used in the present description based on the drawings.

Embodiment 1

The housing 1 which constitutes the outer appearance of this embodiment comprises a case 10 having a cylinder-like shape with a base that has a space to contain the above-mentioned main components, and a lid-shaped plate 11 which fits into and closes the opening side of the case 10. The plate 11 has a bearing 11b at the upper portion from the center, and a part of the shaft 2 is projected from the plate 11 to form an output portion 20. In general, the construction material of the case 10 and the plate 11 is magnetic material such as metal. However, it is not limited to such material, and resin material or resin mold mixed with resin material and magnetic powder may also be used:

The shaft 2 is rotatably held by the aforementioned bearing 11b and a shaft support 10s formed at an inner base 10b of the case 10. Although this embodiment provides the output portion 20 only to the side of the plate 11, it may also be arranged to provide a bearing at the inner base 10b of the case 10 and to project the other end of the shaft 2 from the inner base 10b, thereby providing output portions 20 at both opposing directions of the housing 10.

The oscillating arm 3 is arranged so that its off-center position is fixed in a manner of ring connection to the aforementioned shaft 2 and that a surface along the swinging direction ("swing surface") is perpendicular to the rotation axis of the shaft 2. In other words, the oscillating arm 3 takes a substantial fan shape as viewed from the axial direction, and the shaft 2 penetrates the pivot portion of the fan shape. Two permanent magnets 4 are arranged to have mutually different magnetic poles on the swing surface of the oscillating arm 3, and pole faces 40 with flat surfaces of the permanent magnets 4 are exposed along the swinging direction ("unlike-pole side-by-side installation"). Attachment of this permanent magnets 4 is performed by providing a concave part formed in the oscillating arm 3 made of nonmagnetic materials, such as resin, where the concave part is so formed to match the outer shape of the permanent magnet 4, and by embedding or press-fitting the permanent magnet 4 into the concave part. The attached two permanent magnets 4 are made so that the pole faces are flash with the swing surface. Protruding parts 30 are formed at the lower side of the wing part of the oscillating arm 3 having a fan shape in front view. The protruding parts 30 function as a stopper which contacts with an inner surface 10f of the case 10 to restrict the swing distance.

Next, with regard to the magnet coil 5 which makes the magnetic force act on the aforementioned oscillating arm 3, the magnetic coil 5 is configured by a bobbin body 51 as a frame that has at its center a core 50 made of magnetic material, to which a coil 52 connected to an electric circuit is arranged. The magnetic coils 5 are so arranged that each flat magnetic pole face 53 faces the magnetic pole face 40 of the aforementioned permanent magnet 4 with an air-gap in-between. Two magnetic coils 5 sandwich the aforementioned oscillating arm 3 from both sides.

Figure 8:
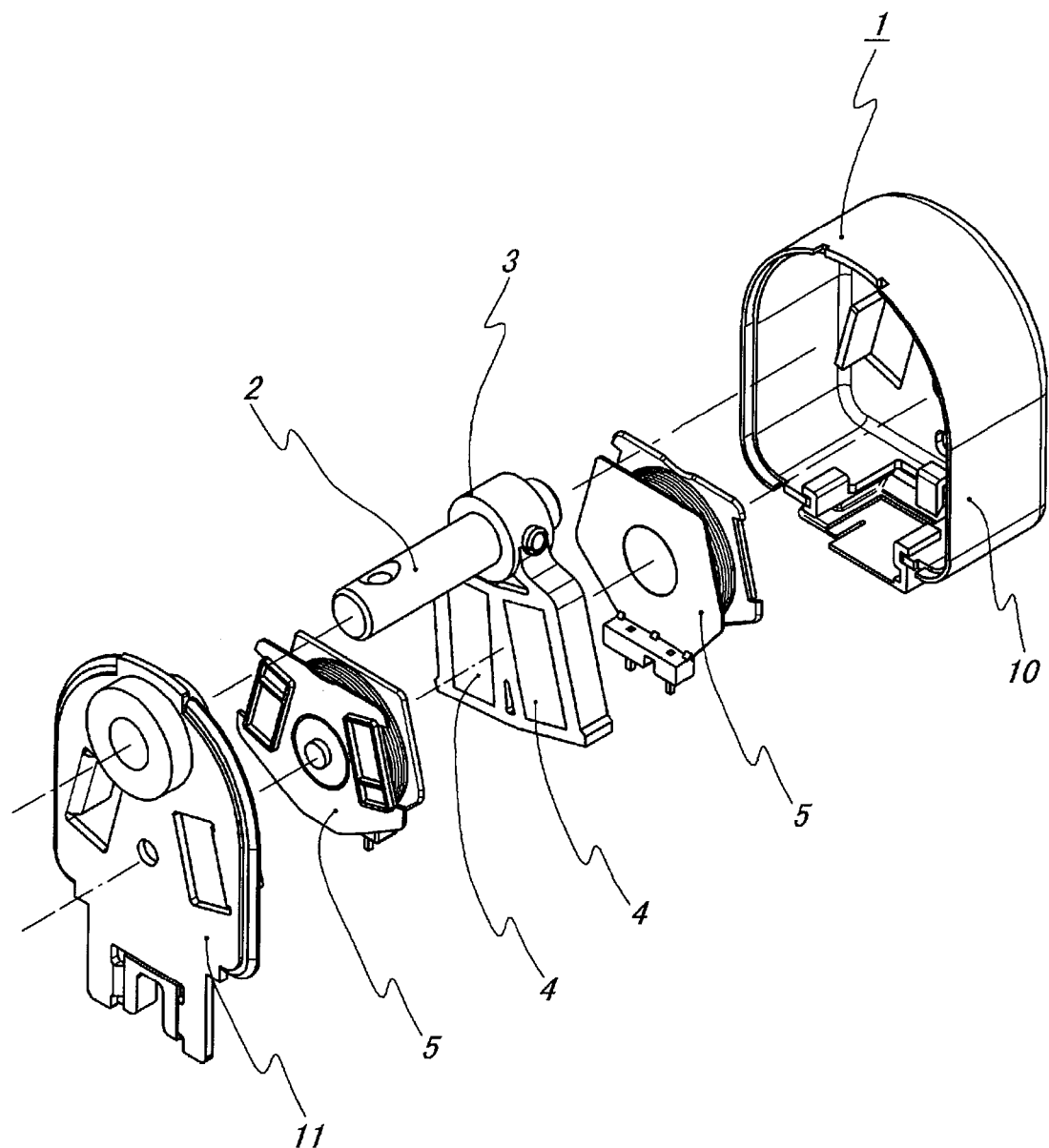
FIG. 8 is an exploded perspective view showing structure of other embodiment example.
Figure 11:
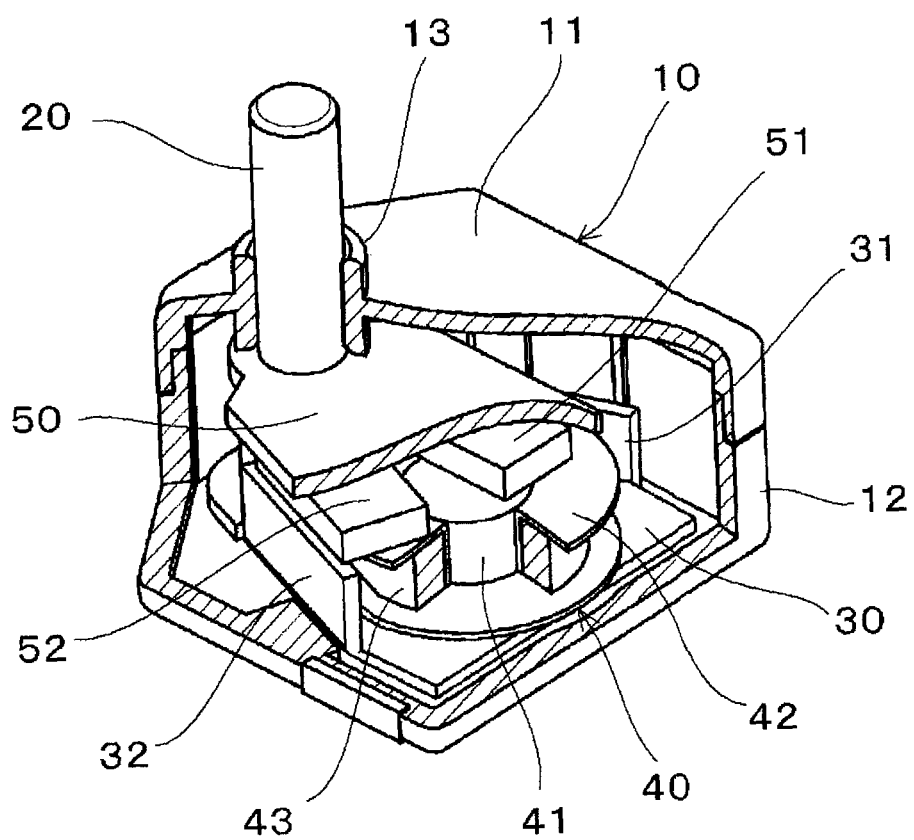
FIG. 11 is a representative drawing included in Patent document 3.

The opposing arrangement of the magnetic coils 5 may be constructed as shown in FIG. 8 where each of them is formed separately and later placed on each side of the oscillating arm 3 at an assembly process. However, in this embodiment shown in FIG. 1, two magnetic coils 5 are arranged apart beforehand by providing a frame-shaped bobbin body 51 having a swinging space 54. The bobbin body 51 is integrally formed by coupling a lower level bottom part 51b and an upper level shoulder part 51s. By this integration, it is intended to improve the firmness of the two magnet coils 5, stability of an arrangement dimension, and simplicity of assembly.

Close to the periphery of the magnet coils 5, the interpoles 6 are arranged in the swing distance. The interpoles 6 are protrudingly formed at the inner base 10b of the case 10 to which one side of the two magnet coils 5 makes contact and also formed at the inner peripheral surface 11 of the plate 11 to which the other side of the magnet coils 5 makes contact. Each of the interpoles 6 formed on the case 10 and the plate 11 is arranged so that their corresponding tip surfaces 60 are opposed to each other. Although the interpoles 6 may be separately formed, the interpoles 6 may also be formed integrally at the time of press working of sheet metal of the case 10 and the plate 11 by piercing and bending. This allows to simplify manufacturing process and to reduce the number of components. The shape of the interpole 6 may take various form, such as a saw teeth shape and a protrusion shape, etc. In this embodiment, the interpole 6 has a shape of standing rectangular plate and has a tip surface 60 formed to be a flat line shape (or a peak shape).

Figure 6:
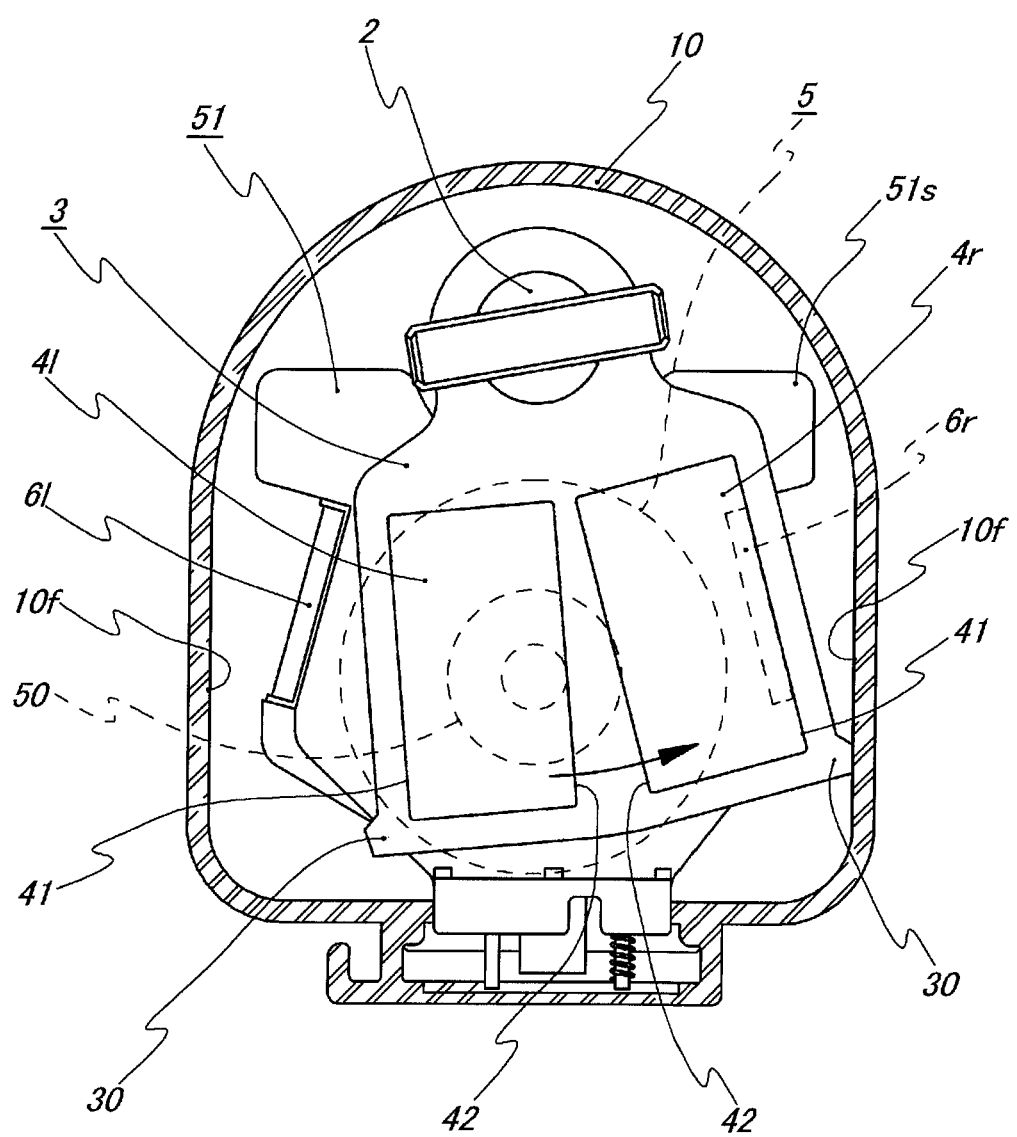
FIG. 6 is a cross sectional view taken along a B-B line of FIG. 4.

Next, referring to FIG. 6, the positional relationship is described with respect to the aforementioned interpoles 6, the two permanent magnets 4 arranged side by side in the aforementioned oscillating arm 3, and the magnet coils 5. When the oscillating arm 3 swings to the right side and stops at an end point (start/end point of swing, or inverse position of swing) of the swing distance, an outer edge part 41 of the permanent magnet 4 of one side (right-hand side) and a pair of interpoles 6 at the right-hand side (denoted by 6*r*) are arranged to be the nearest with each other (or almost overlapping) along the outer edge part 41. At this time, the inner edge part 42 of the permanent magnet 4 of the other side (left-hand side) is arranged to be the nearest (or almost overlapping) with the core surface 50*f* of the two magnet coils 5 sandwiching the permanent magnets 4.

In the condition where the oscillating arm 3 is reversed and stopped at the left-hand side, an outer edge part 41 of the permanent magnet 4 of one side (left-hand side) and a pair of interpoles 6 at the left-hand side (denoted by 61) are arranged to be the nearest with each other (or almost overlapping) along the outer edge part 41. At this time, an inner edge part 42 of the permanent magnet 4 of the right-hand side is arranged to be the nearest (or almost overlapping) with the aforementioned core surface 50*f*.

Figure 7:
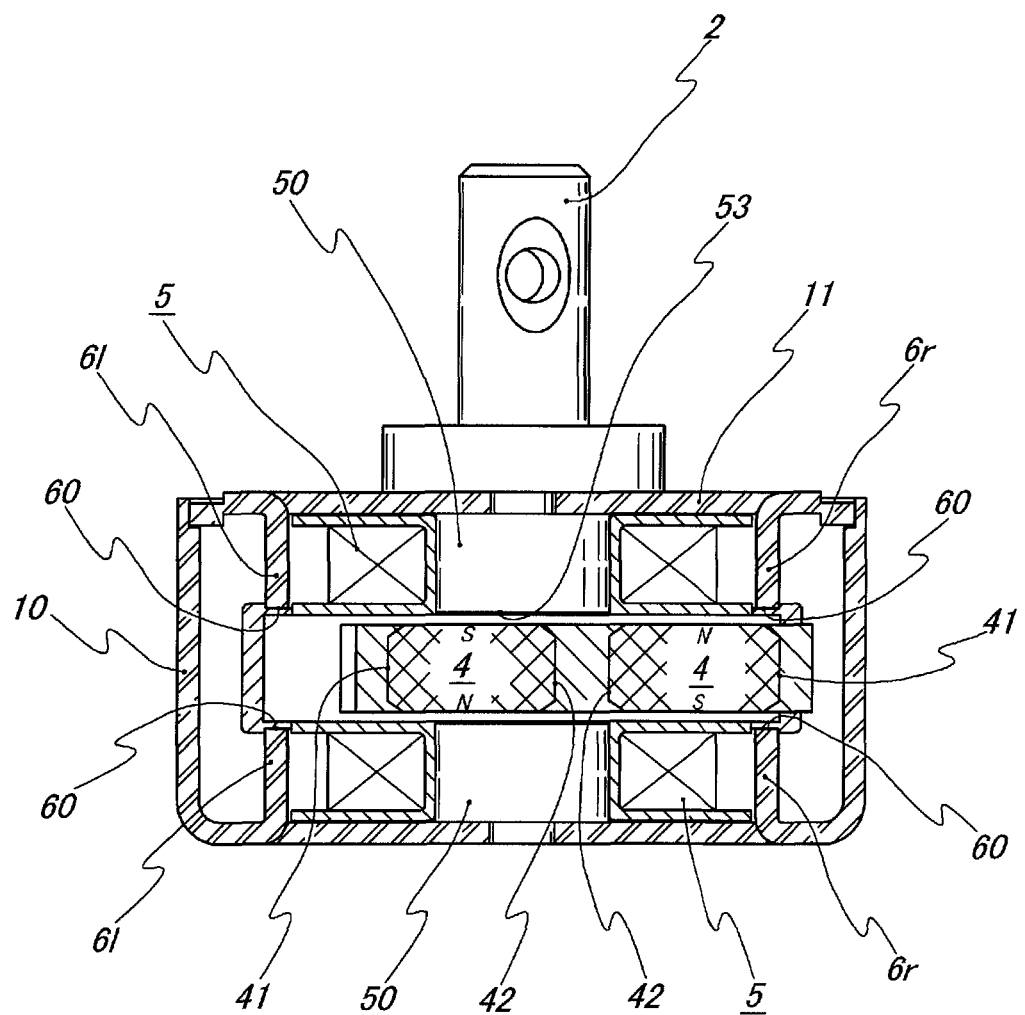
FIG. 7 is a cross sectional view taken along a C-C ling of FIG. 5.

Here, the pair of interpoles 6 means two interpoles 6 arranged to face across the swing surface of the oscillating arm 3. Thus, as apparent from FIG. 7, each one of the interpoles 6 is arranged at left and at right, and each being oriented to the direction of the axis of the shaft, to sandwich the outer peripheral of the magnetic coils 5, which makes four interpoles in total comprising two pairs.

Operation of this Embodiment

Next, referring to FIG. 6, the operation of this embodiment will be described.

When the magnet coils 5 are energized, the magnet coils 5 will excite and magnetic flux occurs perpendicularly (shaft axis direction) from the pole face 53. As a result, a magnetic attraction force is generated which acts on one of the permanent magnets 4 arranged by unlike-pole side-by-side installation, and a magnetic repulsion force is generated which acts on the other permanent magnet 4. The oscillating arm 3 swings (arrow direction) to one direction (right side in FIG. 6), and stops as the protruding part 30 of one side (lower right) contacts the inner surface 10*f* of the case 10 (condition shown in FIG. 6). Next, when the energizing direction to the magnet coils 5 is switched to an opposite direction, magnetic flux in the reverse direction is generated by the magnet coils 5. The magnetic attraction force and the repulsion force to the permanent magnets 4 are reversed also. Thus, the oscillating arm 3 swings to the other side (left side). By properly switching the energizing direction, the oscillating arm 3 makes a center-of-a-circle swing within the range defined by the contact of the protruding parts 30, and the driving force is outputted as axial rotation of the shaft 2 to external instrument (not shown) through the outputting part 20.

Especially, in the condition where the oscillating arm 3 is stopped at one of the ends of the swing distance, a holding force of a certain extent can be maintained even when energization is stopped (non-energization). Namely, with reference to FIG. 7, since the two interpoles 6 of the right side that sandwich the permanent magnet 4, the case 10 and the plate 11 form the shortest magnetic path, a strong magnetic attraction force can be generated by the residual magnetic flux of the permanent magnet 4. At the same time, a magnetic attraction force will be generated between the permanent magnet 4 of the left side and the core 50 of the magnet coil 5 facing each other. Such attraction forces are combined and the stop-holding force of the oscillating arm 3 is strengthened at the time of non-energizing.

Effect of this Embodiment

The following enumerated characteristic effects are obtained due to the configuration of this embodiment described above.

1) The first characteristic effect is that it can form a magnetic circuit of the shortest distance compared to the conventional arrangement where a single interpole 6 is arranged. This is because a pair of interpoles 6 is arranged to hold, at the stop position, one of the two permanent magnets 4 that is arranged on the oscillating arm 3 by unlike-pole side-by-side installation. Therefore, the residual magnetic flux of the permanent magnet 4 can act more effectively and the powerful magnetic attraction force can be obtained, and the stop-holding condition with the holding force can be formed at the time of non-energizing.

2) Next, the second characteristic effect is that a pressing force (thrust direction force) parallel to the shaft that acts on the oscillating arm can be made zero by cancelling out the magnetic force (attraction or repulsion) generated between the magnet coils 5 and the permanent magnets, because the oscillating arm 3 is sandwiched by the two magnet coils 5. The non-action of the thrust direction force means that a bending force (or bending moment) will not act on a coupling part 31 of the oscillating arm 3 that is suspended in a pivot fashion by the shaft 2. Thus, high durability can be achieved by the stable rotation (reciprocation movement along a single swing surface) of the oscillating arm 3 and by the prevention of damage at the coupling part.

3) The third characteristic effect is that a start-up response (responsiveness) is improved and that an impact force at the time of stopping is reduced by minimizing inertia (rotational system inertia moment) of the oscillating arm. This is because a relatively heavy back yoke is not required to the oscillating arm 3 for forming the magnetic path, unlike the inventions disclosed in Patent documents 1 and 3.

In order to confirm the above-mentioned effects, a table below shows the comparison result of a configuration using a single magnet coil according to the invention disclosed in Patent document 3 and a configuration using the two magnet coils opposingly arranged which are the main composition of the invention of this application.

The effectiveness of the configuration of the present invention disclosed in the present application can be easily grasped from this table.

TABLE 1

|  |  | Prior art (one magnetic coil) | Present embodiment (two magnetic coils) |
| --- | --- | --- | --- |
| Input |  | 20.8 [w] | ← |
| Magnet |  | ferrite | ← |
| Core |  | φ6 | ← |
| Interpole |  | t1 | ← |
| Backyoke |  | t0.8 |  |
| Space [mm] | Magnet - Core | 0.5 | ← |
|  | Magnet - Interpole | 0.55 | ← |

TABLE 1-continued

|  |  | Prior art (one magnetic coil) | Present embodiment (two magnetic coils) |
|---|---|---|---|
|  | Backyoke - Front plate | 1.0 |  |
| Hold Torque ×10^-4 [N·m] | Excitation | 550 | 658 |
|  | Non-excitation | 164 | 214 |
| Thrust direction force | Excitation Magnetic repulsion | 0.16 | 0 |
|  | Magnetic attraction | 5.82 | 0 |
|  | Non-excitation | 2.81 | 0 |

EXPLANATION OF NUMERALS

1 Housing
10 Case
11 Plate
2 Shaft
3 Oscillating arm
4 Permanent magnet
40 Pole face
41 Outer edge part
42 Inner edge part
5 Magnet coil
50 Core
51 Bobbin body
52 Magnet coil
53 Pole face
6 Interpole
60 Tip surface

What is claimed is:

1. An oscillating type actuator, comprising:
   a housing having a predetermined inner space;
   a shaft supported in the housing to be axially rotatable and has an output part to produce an output;
   a plate-shape oscillating arm that is fixedly supported to the shaft and has a swing surface perpendicular to the axis of the shaft, and makes a swing about the shaft in a swing direction which is identical to the swing surface;
   two permanent magnets arranged on the swing surface side by side along the swing direction of the oscillating arm and having pole faces different from each other;
   two magnet coils opposingly arranged to respectively face the pole faces of both sides of the permanent magnet with an air gap; and
   two pairs of interpoles made of magnetic material;
   wherein each pair of interpoles are arranged near a corresponding end point of the swing of the oscillating arm at an outer periphery of each magnet coil; and
   wherein each pair of interpoles are oriented in the direction of the axis of the shaft so that tip surfaces of the interpoles opposingly sandwich one of the permanent magnets arranged side by side on the swing surface with an air gap.

2. The oscillating type actuator according to claim 1, wherein:
   the opposing position of the pair of interpoles and the permanent magnet is an outer edge part of a swing of the permanent magnet arranged side by side.

3. The oscillating type actuator according to claim 1, wherein:
   the interpole is formed integrally with the housing made of magnetic material.

4. The oscillating type actuator according to claim 1, wherein:
   the housing comprises a case having a cylinder shape with a bottom and a plate that fits into an opening of the case for closure.

5. The oscillating type actuator according to claim 4 wherein:
   the interpole is formed by bending the bottom of the case and the plate.

6. The oscillating type actuator according to claim 1, wherein:
   a shape of the opposing faces of the interpoles is a border line shape that runs along a perimeter of the permanent magnets.

7. The oscillating type actuator according to claim 1 wherein:
   the pair of magnet coils opposingly arranged to sandwich the oscillating arm is integrally formed by providing a swing space between the opposing magnetic coils.

* * * * *